(12) United States Patent
Peh et al.

(10) Patent No.: US 9,727,238 B2
(45) Date of Patent: Aug. 8, 2017

(54) USER-INTERFACE FOR ENTERING ALPHANUMERICAL CHARACTERS

(71) Applicant: HOME CONTROL SINGAPORE PTE. LTD., Toa Payoh (SG)

(72) Inventors: Beng Tee Peh, Singapore (SG); Andries Jacob Benoit Rambouts, Herent (BE)

(73) Assignee: HOME CONTROL SINGAPORE PTE. LTD., Toa Payoh (SG)

( * ) Notice: Subject to any disclaimer, the term of this patent is extended or adjusted under 35 U.S.C. 154(b) by 375 days.

(21) Appl. No.: 14/401,849

(22) PCT Filed: May 23, 2013

(86) PCT No.: PCT/IB2013/054268
§ 371 (c)(1),
(2) Date: Nov. 18, 2014

(87) PCT Pub. No.: WO2013/182942
PCT Pub. Date: Dec. 12, 2013

(65) Prior Publication Data
US 2015/0135121 A1    May 14, 2015

Related U.S. Application Data (60) Provisional application No. 61/654,997, filed on Jun. 4, 2012.

(51) Int. Cl.
*G06F 3/00*  (2006.01)
*G06F 3/0489*  (2013.01)
(Continued)

(52) U.S. Cl.
CPC ........ *G06F 3/04892* (2013.01); *G06F 3/0236* (2013.01); *G06F 3/0362* (2013.01);
(Continued)

(58) Field of Classification Search
CPC .......................................... G06F 3/0481–3/0489
See application file for complete search history.

(56) References Cited

U.S. PATENT DOCUMENTS 5,543,818 A    8/1996  Scott
5,790,115 A *  8/1998  Pleyer ................... G06F 3/0236
                                                   348/E5.099
(Continued)

FOREIGN PATENT DOCUMENTS

WO    2008075996 A1    6/2008
WO    WO 2013/182942 A1    12/2013

OTHER PUBLICATIONS

International Search Report for Int'l Application No. PCT/IB2013/054268, "User-Interface for Entering Alphanumerical Characters," date mailed Oct. 2, 2013.
(Continued)

*Primary Examiner* — Steven B Theriault
(74) *Attorney, Agent, or Firm* — Hamilton, Brook, Smith & Reynolds, P.C.

(57) ABSTRACT

An information processing system has a display monitor and a user-interface for text entry. The display monitor presents the set of alphanumerical characters in a spatial configuration of three parallel horizontal rows or three parallel vertical columns. The "left"-button and the "right" button of the directional buttons of the user-interface control the selection of a group of alphanumerical characters, one of each of the three parallel arrays and positioned in the same column. The "up"-button and the "down"-button of the directional buttons and the "OK"-button, sitting in between, are used to select a specific one of the alphanumerical characters from the selected group.

8 Claims, 4 Drawing Sheets

(51) Int. Cl.
  *G06F 3/0488* (2013.01)
  *G06F 3/023* (2006.01)
  *G06F 3/0362* (2013.01)
  *G06F 3/0485* (2013.01)
  *G06F 3/0484* (2013.01)

(52) U.S. Cl.
  CPC .......... *G06F 3/0485* (2013.01); *G06F 3/0488* (2013.01); *G06F 3/0484* (2013.01)

(56) References Cited

U.S. PATENT DOCUMENTS

| | | | | |
|---|---|---|---|---|
| 6,075,533 A * | 6/2000 | Chang | ............. | G06F 3/038 345/163 |
| 7,218,249 B2 | 5/2007 | Chadha | | |
| 7,530,031 B2 * | 5/2009 | Iwamura | ............. | G06F 3/018 715/780 |
| 7,665,034 B2 * | 2/2010 | Levi Montalcini | ... | G06F 3/0485 715/784 |
| 7,868,787 B2 * | 1/2011 | Chung | ............. | G06F 3/0236 341/33 |
| 8,040,319 B2 * | 10/2011 | Heynen | ............. | G06F 3/04847 345/156 |
| 8,239,784 B2 * | 8/2012 | Hotelling | ............. | G06F 3/0418 345/173 |
| 8,374,846 B2 * | 2/2013 | Assadollahi | ............. | G06F 3/0234 704/10 |
| 8,416,192 B2 * | 4/2013 | Wilairat | ............. | G06F 3/0237 345/168 |
| 8,441,439 B2 * | 5/2013 | Heynen | ............. | G06F 3/04847 345/156 |
| 8,499,000 B2 * | 7/2013 | Brown | ............. | G06F 17/30973 707/722 |
| 8,552,992 B1 * | 10/2013 | Kim | ............. | G06F 3/0234 345/173 |
| 8,645,996 B2 * | 2/2014 | Heo | ............. | G06F 3/0236 345/156 |
| 8,683,327 B2 * | 3/2014 | Metso | ............. | G06F 3/0236 715/255 |
| 8,756,522 B2 * | 6/2014 | Lee | ............. | G06F 3/04883 715/773 |
| 8,839,123 B2 * | 9/2014 | Landry | ............. | G06F 3/0236 715/726 |
| 8,949,743 B2 * | 2/2015 | Kida | ............. | G06F 3/0234 715/773 |
| 9,063,642 B2 * | 6/2015 | Edwards | ............. | G06F 17/276 |
| 2002/0060699 A1 * | 5/2002 | D'Agostini | ............. | G06F 1/1616 715/783 |
| 2002/0089435 A1 * | 7/2002 | Hanamoto | ............. | G06F 3/0236 341/20 |
| 2002/0093535 A1 * | 7/2002 | Murphy | ............. | G06F 3/04886 715/764 |
| 2004/0001105 A1 * | 1/2004 | Chew | ............. | H04M 1/72583 715/817 |
| 2004/0030807 A1 | 2/2004 | Wessler et al. | | |
| 2004/0066405 A1 * | 4/2004 | Wessler | ............. | G06F 1/1626 715/764 |
| 2005/0195159 A1 * | 9/2005 | Hunleth | ............. | G06F 3/0236 345/156 |
| 2007/0236475 A1 * | 10/2007 | Wherry | ............. | G06F 3/0485 345/173 |
| 2007/0247421 A1 * | 10/2007 | Orsley | ............. | G06F 3/0362 345/156 |
| 2007/0294636 A1 * | 12/2007 | Sullivan | ............. | G06F 3/0236 715/810 |
| 2008/0158162 A1 * | 7/2008 | Ahn | ............. | G06F 3/0233 345/168 |
| 2008/0252597 A1 * | 10/2008 | Heynen | ............. | G06F 3/04847 345/157 |
| 2010/0005392 A1 * | 1/2010 | Wang | ............. | G06F 9/4443 715/716 |
| 2010/0073329 A1 * | 3/2010 | Raman | ............. | G06F 3/04883 345/177 |
| 2010/0231503 A1 * | 9/2010 | Senda | ............. | G06F 3/0236 345/156 |
| 2011/0035209 A1 * | 2/2011 | Macfarlane | ............. | G06F 3/0237 704/9 |
| 2011/0069012 A1 * | 3/2011 | Martensson | ............. | G06F 3/04847 345/173 |
| 2011/0080351 A1 * | 4/2011 | Wikkerink | ............. | G06F 3/04883 345/173 |
| 2012/0030606 A1 * | 2/2012 | Zhang | ............. | G06F 3/0234 715/773 |
| 2012/0038556 A1 | 2/2012 | Toebes et al. | | |
| 2012/0235912 A1 * | 9/2012 | Laubach | ............. | G06F 3/04895 345/163 |
| 2013/0002567 A1 * | 1/2013 | Lee | ............. | G06F 3/04883 345/173 |

OTHER PUBLICATIONS

Written Opinion for Int'l Application No. PCT/IB2013/054268, "User-Interface for Entering Alphanumerical Characters," date mailed Dec. 4, 2014.

International Preliminary Report on Patentability for Int'l Application No. PCT/IB2013/054268, "User-Interface for Entering Alphanumerical Characters," date issued Dec. 9, 2014.

* cited by examiner

USER-INTERFACE FOR ENTERING ALPHANUMERICAL CHARACTERS

CROSS-REFERENCE TO PRIOR APPLICATIONS

This application is the U.S. National Phase application under 35 U.S.C. §371 of International Application No. PCT/IB2013/054268, filed on May 23, 2013, which claims the benefit of U.S. Provisional Application No. 61/654,997, filed on Jun. 4, 2012. This application is hereby incorporated by reference herein.

FIELD OF THE INVENTION

The invention relates to an information processing system with a display monitor and a user-interface for enabling a user to interact with the information processing system in a specific operational mode of the information processing system, for entering a string of alphanumerical characters into the information processing system. The invention further relates to The invention further relates to an interface for use in such an information processing system and configured for interfacing the user-interface to a data processing subsystem of the information processing system, and to control software for configuring the information processing system for enabling a user to enter a string of alphanumerical characters into the information processing system.

BACKGROUND ART

U.S. patent application Ser. No. 13/280,948 (also U.S. Patent Application Publication No. 2012/0038556, now U.S. Pat. No. 8,311,588 B2), incorporated herein by reference, discloses a device, method, and user interface for providing entry of alphanumeric text. In one form, a method for providing selectable characters within a user interface includes determining an operating mode of a communication device and receiving an input associated with a selected input key. The method determines a group of characters associated with the selected key based on the operating mode and displays the group of characters within the user interface. The user interface may display a first character of the group of characters within a first portion of the user interface and the group of characters proximal to the first character within a second portion of the user interface. U.S. patent application Ser. No. 13/280,948 (also U.S. Patent Application Publication No. 2012/0038556, now U.S. Pat. No. 8,311,588 B2), discusses providing a cursor which may be substantially centered about a group of selectable characters. The group of characters may be displayed in a segmented manner to enhance viewability of alphanumeric text within a user interface. The user interface may display a group of characters based on a selected key and further display a bubble help cursor positioned relative to a highlighted character within the group of characters. The bubble help cursor includes the highlighted character and a user may scroll the group of characters using a bubble help cursor that displays the next or previous character within the group of characters.

SUMMARY OF THE INVENTION

The user interface for providing entry of alphanumeric text disclosed in U.S. patent application Ser. No. 13/280,948 (also U.S. Patent Application Publication No. 2012/0038556, now U.S. Pat. No. 8,311,588 B2), has a twelve keys or buttons, and each specific one of the keys has a fixed relationship with a specific group of text characters. Each specific one of the twelve keys has a specific label listing the specific group of characters to which the specific key is related.

A drawback of this known approach is that the number of the keys is determined by the set of the selectable text characters. Another drawback is that the size of each label is determined by the dimensions of the key. The size of the label determines the maximum number of characters that can be accommodated on the label as the characters should remain legible for the user to select. Still another drawback is that the approach taken in U.S. patent application Ser. No. 13/280,948 (also U.S. Patent Application Publication No. 2012/0038556, now U.S. Pat. No. 8,311,588 B2), cannot easily be applied to the user-interface of handheld electronic devices such as remote control devices for control of consumer electronics (CE) equipment or smartphones.

The inventors therefore propose an information processing system with a display monitor and a user-interface. The user-interface is configured for enabling a user to interact with the information processing system. The user-interface comprises a first control input for, in a first operational mode of the information processing system, enabling the user to control one of: 1) moving a cursor on a screen of the display monitor in substantially a first orientation relative to the display monitor and 2) scrolling in substantially the first orientation. The user-interface comprises a second control input, different from the first control input, for, in the first operational mode of the information processing system, enabling the user to control one of: 3) moving the cursor on the screen in substantially a second orientation relative to the display monitor, different from the first orientation; and 4) scrolling in substantially the second orientation. The information processing system has a second operational mode for enabling the user to enter a string of alphanumerical characters into the information processing system via interaction with the user-interface. In the second operational mode, the information processing system is configured for controlling the display monitor to present a plurality of selectable alphanumerical characters. The alphanumerical characters include, e.g., the letters of the alphabet in lower case, upper case or both, punctuation marks, and the natural numbers 0, 1, . . . , 8 and 9. The display monitor presents the plurality of selectable alphanumerical characters in a spatial configuration comprising a first array of first ones of the plurality of selectable alphanumerical characters and a second array of second ones of the plurality of selectable alphanumerical characters. The display monitor is then operative to present the first array and the second array as extending in parallel in substantially a same specific one of the first orientation and the second orientation. In the second operational mode, the information processing system is also configured for enabling the user to select a specific combination of a specific one of the first alphanumerical characters and a specific one of the second alphanumerical characters. The selection is achieved through the user positioning an indicium, e.g., a highlight, a semitransparent overlay or another marking, at a specific position corresponding with the specific combination in the spatial configuration by means of using a single one of the first control input and the second control input. In the second operational mode, the information processing system is also configured for enabling the user to select a particular one of the specific first alphanumerical character and the specific second alphanumerical character through using the other one of the first control input and the second control input.

In the information processing invention operating in the second operational mode, the display monitor presents the alphanumerical characters in a specific spatial configuration using at least a first array and a second array that run substantially in parallel in the same orientation, e.g., horizontally, or vertically. The first control input is used to position the indicium along the spatial configuration to select a combination of alphanumerical characters, and the second control input is used to select a particular one of the alphanumerical characters within the selected combination. As the alphanumerical characters are being displayed on the display monitor in the second operational mode of the information processing system, each of the first control input and the second control input can conveniently be configured under software control and optimized for their respective selection task, given the capabilities of the user-interface at hand. This contrasts with limited options available via the user interface in U.S. patent application Ser. No. 13/280,948 (also U.S. Patent Application Publication No. 2012/0038556, now U.S. Pat. No. 8,311,588 B2), discussed above.

In an embodiment of the information processing system of the invention, the first control input comprises at least one of the following: 1) a first set including a first switch (or: first button) for moving the cursor in a first direction in the first orientation and a second switch (or: second button) for moving the cursor in a second direction, opposite to the first direction, in the first orientation; 2) a first rotary input for scrolling in the first direction or in the second direction in dependence on a clockwise rotating of the first rotary input or an anti-clockwise rotating of the first rotary input, respectively; and 3) a first touchpad. The second control input comprises at least one of the following: 4) a second set including a third switch (or: third button) for moving the cursor in a third direction in the second orientation and a fourth switch (or: fourth button) for moving the cursor in a fourth direction, opposite to the third direction, in the second orientation; 5) a second rotary input for scrolling in the third direction or in the fourth direction in dependence on a clockwise rotating of the second scroll wheel or an anti-clockwise rotating of the second scroll wheel, respectively; and 6) a second touchpad.

For example, the first control input is formed by the first button for moving the cursor to the left (or to the right) and the second button for moving the cursor to the right (or to the left), and the second control input is formed by the third button for moving the cursor upwards (or downwards) and the fourth button for moving the cursor downwards (or upwards). The first button, the second button, the third button and the fourth button are formed by, e.g., the directional keys, or: arrow keys, conventionally present at a standard remote control device for control of CE equipment. The words "switch", "button" and "key" have been used interchangeably throughout this text when referring to a discrete element of a user-interface.

As another example, the first control input is formed by the first rotary input, e.g., a scroll wheel, for scrolling to the left or to the right, and the second control input is formed by the third button for moving the cursor upwards (or downwards) and the fourth button for moving the cursor downwards (or upwards). For an example of a remote control device for control of CE equipment and equipped with directional keys and a scroll wheel see, e.g., the "PRESTIGO SRU8015" universal remote control device and the PHILIPS "PRESTIGO SRU9600/17" universal remote control device, both from N.V. (Royal Philips Electronics of the Netherlands company).

As yet another example, the first control input is formed by the first touchpad and the second control input is formed by the second touchpad. As known, a touchpad (also referred to as a "trackpad") has a tactile sensor and a specialized surface and that can be used as a pointing device by means of translating the movement and position of a user's finger, which is in contact with the surface, to a relative position of an indicium or a cursor on the screen of the display monitor. The first touchpad and the second touchpad may be two separate touchpads or may be one and the same touchpad. The first touchpad and/or the second touchpad may comprise a clickable touchpad that incorporates switch functionality. When the information processing system is in the second operational mode (for text entry), clicking of the clickable touchpad may be interpreted as jumping to a next available option. For example, swiping one's finger across the clickable touchpad controls selection of a specific combination of a specific one of the first alphanumerical characters in the first array and a specific one of the second alphanumerical characters in the second array, and clicking the clickable touchpad controls selecting a particular one of the specific first alphanumerical character in the combination and the specific second alphanumerical character in the combination. Alternatively, the first touchpad and/or the second touchpad may comprise an un-clickable touchpad. Tapping the unclickable touchpad may then be interpreted as jumping to a next available option.

In a further embodiment of the information processing system of the invention, the user-interface comprises a third control input for, in the first operational mode of the information processing system, confirming selection of a menu option by the user after having positioned the cursor at the menu option. The third control input is positioned in the user-interface at least between the first switch and the second switch or between the third switch and the fourth switch; The spatial configuration comprises a third array with third ones of the plurality of selectable alphanumerical characters. The third array substantially extends in the same specific one of the first orientation and the second orientation as the first array and the second array. The third array is positioned between the first array and the second array. In the second operational mode, the information processing system is configured for enabling the user to select a specific one of the third alphanumerical characters that is located between the specific first alphanumerical character and the specific second alphanumerical character, via the third control input.

An example of such third control input is the "OK"-button typically found on conventional universal remote control devices and surrounded by the directional keys, discussed earlier. The "OK"-button is conventionally used for confirming an action, proposed by a computer or CE equipment, be carried out, or for confirming a menu option selected by the user through the user positioning a highlight or cursor at the menu option displayed on a screen of a display monitor. The invention conveniently uses the "OK"-button to select the specific third alphanumerical character. Remember that the specific third alphanumerical character is positioned between the specific first alphanumerical character and the specific second alphanumerical character in the group, and that the first alphanumerical character can be selected by one of the directional buttons, e.g., the "upwards"-button, and the second alphanumerical character can be selected by the opposite one of the directional buttons, here: the "downwards"-button. As the "OK"-button sits between the "upwards"-button and the "downwards"-button, the positions of the "upwards"-button, of the "OK"-button and of the "downwards"-button match the positions of the first alphanumerical character, of the second alphanumerical character and of the third alphanumerical character in the group previously selected.

Accordingly, and referring to a simple embodiment of the invention, the invention relates to an information processing system having a display monitor and a user-interface for text entry. The display monitor presents the set of alphanumerical characters in a spatial configuration of three parallel horizontal rows. The "left"-button and the "right" button of the directional buttons in the user-interface control the selection of a group of alphanumerical characters, one of each of the three parallel arrays and positioned in the same column. The "up"-button and the "down"-button of the directional buttons and the "OK"-button, sitting in between, are used to select a specific one of the alphanumerical characters from the selected group.

The invention can also be commercially exploited as control software, e.g., recorded on a computer-readable medium or provided as a downloadable file via the Internet. The control software is installed on a data processing sub-system of an information processing system for configuring the data processing sub-system. The information processing system has a display monitor and a user-interface for enabling a user to interact with the information processing system. The data processing sub-system has a first interface for interfacing with the display monitor and a second interface for interfacing with the user-interface. The user-interface comprises a first control input for, in a first operational mode of the information processing system, enabling the user to control one of moving a cursor on a screen of the display monitor in substantially a first orientation relative to the display monitor; and scrolling in substantially the first orientation. The user-interface comprises a second control input for, in the first operational mode of the information processing system, enabling the user to control one of moving the cursor on the screen in substantially a second orientation relative to the display monitor, different from the first orientation; and scrolling in substantially the second orientation. The control software comprises first instructions for configuring the information processing system for operating in a second operational mode for enabling the user to enter a string of alphanumerical characters into the information processing system via interaction with the user-interface. The first instructions comprise second instructions for controlling the display monitor to present a plurality of selectable alphanumerical characters in a spatial configuration comprising a first array of first ones of the plurality of selectable alphanumerical characters and a second array of second ones of the plurality of selectable alphanumerical characters. The first array and the second array are presented as extending in parallel in substantially a same specific one of the first orientation and the second orientation. The first instructions comprise third instructions for selecting a specific combination of a specific one of the first alphanumerical characters and a specific one of the second alphanumerical characters through positioning an indicium at a specific position corresponding with the specific combination in the spatial configuration in response to the user interacting with one of the first control input and the second control input. The first instructions comprise fourth instructions for selecting a particular one of the specific first alphanumerical character and the specific second alphanumerical character in response to the user interacting with the other one of the first control input and the second control input.

An embodiment of the control software can be used in case the user-interface comprises a third control input for, in the first operational mode of the information processing system, confirming selection of a menu option by the user after having positioned the cursor at the menu option. The third control input is positioned in the user-interface at least between the first switch and the second switch or between the third switch and the fourth switch. The spatial configuration comprises a third array with third ones of the plurality of selectable alphanumerical characters. The third array substantially extends in the same specific one of the first orientation and the second orientation. The third array is positioned between the first array and the second array. The first instructions comprise fifth instructions for selecting a specific one of the third alphanumerical characters that is located between the specific first alphanumerical character and the specific second alphanumerical character, in response to the user interacting with the third control input.

The invention can also be commercially exploited as an interface for having the user-interface with a data processing sub-system of the information processing system. The invention then relates to an interface for use in an information processing system that has a display monitor, and a data processing sub-system for control of the display monitor. The interface is configured for interfacing a user-interface with the data processing sub-system. The user-interface comprises a first control input for, in a first operational mode of the information processing system, enabling the user to control one of: moving a cursor on a screen of the display monitor in substantially a first orientation relative to the display monitor; and scrolling in substantially the first orientation. The user-interface comprises a second control input for, in the first operational mode of the information processing system, enabling the user to control one of: moving the cursor on the screen in substantially a second orientation relative to the display monitor, different from the first orientation; and scrolling in substantially the second orientation. The interface is configured for enabling the user to enter a string of alphanumerical characters into the information processing system via interaction with the user-interface. The interface is configured for controlling the display monitor to present a plurality of selectable alphanumerical characters in a spatial configuration comprising a first array of first ones of the plurality of selectable alphanumerical characters and a second array of second ones of the plurality of selectable alphanumerical characters. The display monitor is operative to present the first array and the second array as extending in parallel in substantially a same specific one of the first orientation and the second orientation. The interface is configured for selecting a specific combination of a specific one of the first alphanumerical characters and a specific one of the second alphanumerical characters through positioning an indicium at a specific position corresponding with the specific combination in the spatial configuration in response to the user interacting with one of the first control input and the second control input. The interface is configured for selecting a particular one of the specific first alphanumerical character and the specific second alphanumerical character in response to the user interacting with the other one of the first control input and the second control input.

An embodiment of the interface can be used in case the user-interface comprises a third control input for, in the first operational mode of the information processing system, confirming selection of a menu option by the user after having positioned the cursor at the menu option. The third control input is positioned in the user-interface at least between the first switch and the second switch or between the third switch and the fourth switch. The spatial configuration comprises a third array with third ones of the plurality of selectable alphanumerical characters. The third array substantially extends in the same specific one of the first orientation and the second orientation. The third array is positioned between the first array and the second array. The interface is configured for selecting a specific one of the third alphanumerical characters that is located between the specific first alphanumerical character and the specific second alphanumerical character, in response to the user interacting with the third control input.

The interface in the invention may be provided as, e.g., a dongle with an IR (infrared) receiver or an RF (radio frequency) receiver for receiving commands from a conventional remote control device and with, e.g., a USB port, an IR transmitter or an RF transmitter to send to the data processing sub-system the proper commands that are generated in the dongle in response to receiving the commands from the remote control device.

BRIEF DESCRIPTION OF THE DRAWING

The invention is explained in further detail, by way of example and with reference to the accompanying drawing, wherein.

Throughout the Figures, similar or corresponding features are indicated by same reference numerals.

DETAILED EMBODIMENTS

Figure 1:
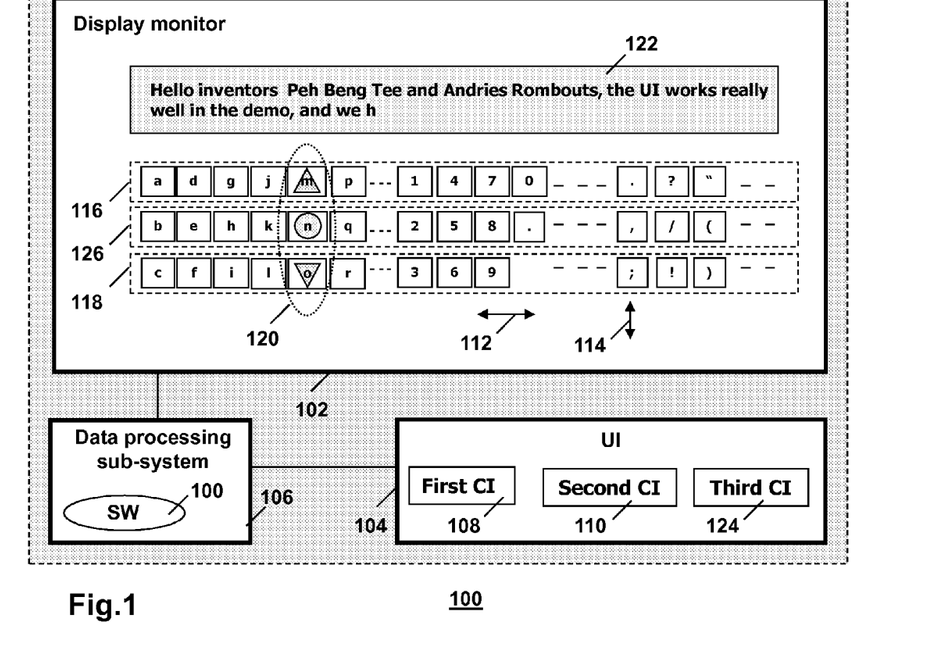
FIG. 1 is a block diagram of a system in the invention.

FIG. 1 is a block diagram of an information processing system 100 with a display monitor 102 and a user-interface 104 for enabling a user to interact with the information processing system 100. The user-interface 104 is coupled to the display monitor 102 via a data processing sub-system 106. The coupling between the user-interface 104 and the data processing sub-system 106 may be wired or wireless (e.g., via radio-frequency (RF) or infrared (IR)). The data processing sub-system 106 is configured for translating the interaction of the user with the user-interface 104 into control commands for the display monitor 102. The user-interface 104 comprises a first control input 108 and a second control input 110.

The first control input 108 is configured for, in a first operational mode of the information processing system 100, enabling the user to control, for example, moving, e.g., a cursor (not shown), a highlight (not shown) or another indicium (not shown), on the screen of the display monitor 102 in substantially a first orientation 112 relative to the display monitor 102. In the example shown, the first orientation 112 is the horizontal orientation, and the first control input 108 is then configured for moving, e.g., the cursor to the left or to the right. Alternatively, the first control input 108 is configured for scrolling, e.g., a text document or a picture rendered on the display monitor 102, in substantially the first orientation 112, in the example shown to the left or to the right.

The second control input 110 is configured for, in the first operational mode of the information processing system 100, enabling the user to control moving, e.g., the cursor on the screen in substantially a second orientation 114 relative to the display monitor 102, different from the first orientation 112. In the example shown, the second orientation 114 is the vertical orientation, and the second control input 110 is then configured for moving, e.g., the cursor upwards or downwards. Alternatively, the second control input 110 is configured for scrolling, e.g., a text document or a picture rendered on the display monitor 102, in substantially the second orientation 114, in the example shown upwards or downwards. Examples of the first control input 108 and the second control input 110 are well known from, e.g., user-interfaces of universal remote control devices in the consumer electronics market and from user-interfaces of smartphones.

The information processing system 100 also has a second operational mode for enabling the user to enter a string of alphanumerical characters into the information processing system 100 via interaction with the user-interface 104. In the second operational mode, the information processing system 100 is configured for controlling the display monitor 102 to present a plurality of selectable alphanumerical characters in a spatial configuration comprising a first array 116 of first ones of the plurality of selectable alphanumerical characters and a second array 118 of second ones of the plurality of selectable alphanumerical characters. The expression "alphanumerical characters" is used herein to refer to a set of basic written characters or symbols which is used to write one or more languages based on the general principle that each of the characters or symbols represents a phoneme, a word, a semantic unit or a syllable, for example, the letters of an alphabet (Greek, Latin, Cyrillic, Hebrew, Hindi, etc.) in lower case, upper case or both, punctuation marks, and the natural numbers 0, 1, . . . , 8 and 9. The display monitor 102 is operative to present the first array 116 and the second array 118 as extending in parallel in substantially a same specific one of the first orientation 112 and the second orientation 114. In the example shown, the first array 116 and the second array 118 run straight in the horizontal orientation 112, with the second array 118 being presented underneath the first array 116.

Furthermore in the second operational mode, the information processing system 100 is configured for enabling the user to select a specific combination of a specific one of the first alphanumerical characters and a specific one of the second alphanumerical characters through positioning an indicium, here illustrated by way of example as a dotted ellipse 120, at a specific position corresponding with the specific combination in the spatial configuration using, in the example of FIG. 1, the first control input 112. That is, in the example illustrated, the first control input 108 enables the user to move the ellipse 120 along the spatial configuration in the horizontal direction, thereby enabling to select each time a pair of a specific first alphanumerical character, in the diagram of FIG. 1 the letter "m" in the first array 116, and a specific second alphanumerical character, in the diagram of FIG. 1 the letter "o" in the second array 118. Also in the second operational mode, the information processing system 100 is configured for enabling the user to select a particular one of the specific first alphanumerical character and the specific second alphanumerical character through using the second control input 110 in this example.

Accordingly, the invention enables to use one of the first control input 108 and the second control input 110 for selecting a group of specific alphanumerical characters (in the example shown the group is formed by the letter "m" and the letter "o") by means of positioning an indicium at a position along the spatial configuration of the first array 116 and the second array 118, and to use the second control input 110 to select a single one of the group's specific characters, e.g., the letter "o" of the illustrated example.

In the second operational mode of the information processing system 100, the data processing sub-system 106 controls the display monitor 102 to collect in a field 122 the alphanumerical characters of the text that has been entered so far.

In the illustrated embodiment of the information processing system 100, the user-interface 104 comprises a third control input 124 for, in the first operational mode of the information processing system 100, confirming selection of a menu option (not shown) by the user after having positioned the cursor at the menu option in a menu (not shown) as displayed on the display monitor 102. The spatial configuration comprises a third array 126 with third ones of the plurality of selectable alphanumerical characters. The third array 126 substantially extends in the same specific one of the first orientation 112 and the second orientation 114, here the horizontal orientation. The third array 126 is positioned between the first array 116 and the second array 118. In the second operational mode, the information processing system 100 is configured for enabling the user to select a specific one of the third alphanumerical characters that is located between the specific first alphanumerical character and the specific second alphanumerical character, via the third control input 124. In the example shown, the specific third alphanumerical character in the letter "n", sitting between the first specific alphanumerical character being the letter "m" and the second specific alphanumerical character being the letter "o".

The diagram of FIG. 1 shows each respective one of the first array 116, the second array 118 and the third array 126 as a rectangle that encloses a respective sequence of alphanumerical characters arranged along a straight line in the horizontal direction. Shapes other than the rectangle, and spatial arrangements of alphanumerical characters other than along a straight line are feasible for the first array 116, the second array 118 and the third array 126. For example, the first array 116, the second array 118 and the third array 126 are formed as concentric block arcs or donuts, wherein the respective spatial arrangement of alphanumerical characters follows a curve. Also, the spatial configuration of the first array 116, the second array 118 and the third array 126 is shown as having its main dimension in the horizontal orientation 112. That is, in the example shown, each of the first array 116, the second array 118 and the third array 126 forms a respective horizontal row, wherein the respective alphanumerical characters are presented on the screen of the display monitor 102 as horizontally arranged one after the other. An alternative spatial configuration (not shown) of the first array 116, the second array 118 and the third array 126 may have each of the first array 116, the second array 118 and the third array 126 formed by a respective vertical column, wherein the respective alphanumerical characters are presented on the screen of the display monitor 102 as vertically arranged one after the other.

Figure 2:
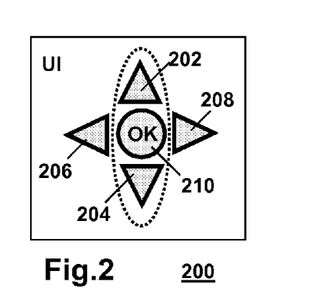
FIGS. 2 and 3 are diagrams of examples of a user-interface for the system in the invention.
Figure 3:
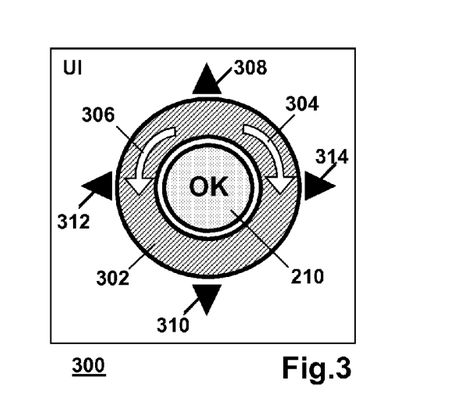

FIGS. 2 and 3 illustrate conventional examples of the user-interface 104 that forms part of, for example, a remote control device for controlling (consumer electronics) equipment, a smartphone or another electronic handheld device, and that can be used to advantage in the information processing system 100 according to the invention.

FIG. 2 is a diagram of a first example 200 of the user-interface 104 implemented with four directional keys (an "UP"-button 202, a "DOWN"-button 204, a "LEFT"-button 206 and a "RIGHT"-button 208) centered around an "OK"-button 210. The four directional buttons are typically used to maneuver a cursor or highlight across the screen of a display monitor for interacting with a menu of control options for control of the equipment. The "OK"-button 210 is typically used to confirm selection of a particular menu option indicated by the cursor or highlight after the user has positioned the cursor or highlight at or over the particular menu option in the menu as displayed on the display monitor.

The example 200 of the user-interface 104 lets the user interact with the information processing system 100 in the second operational mode (text entry) in a convenient and intuitively clear manner. In the second operational mode, the first control input 108 for moving the indicium, e.g., the ellipse 120, horizontally along the spatial configuration of the first array 116, the second array 118 and the third array 126, is implemented by the "LEFT"-button 206 and the "RIGHT"-button 208. In the second operational mode, the second control input 110 is used for selecting the specific first alphanumerical character in the first array 116 or the specific second alphanumerical character in the second array 118 from the group of alphanumerical characters associated with the current position of the ellipse 120. The second control input 110 is then conveniently implemented by means of the "UP"-button 202 and the "DOWN"-button 204. The "OK"-button 124 sits between the "UP"-button 202 and the "DOWN"-button 204. Accordingly, the "OK"-button 124 is conveniently used to select the specific third alphanumerical character in the third array 126 from the group of alphanumerical characters associated with the current position of the ellipse 120.

FIG. 3 is a diagram of a second example 300 of the user-interface 104 implemented by means of a clickable scroll wheel 302 and the "OK"-button 124 in the center of the clickable scroll wheel 302. A scroll wheel is known in the art of user-interfaces and enables user-input by the user rotating the scroll wheel in a clockwise direction 304 or in an anti-clockwise direction 306. A scroll wheel thus enables incremental changes in user-input per unit of rotation. When used in the second operational mode (text entry) of the information processing system 100, the incremental changes are highly suitable for controlling the position of the indicium, here the ellipse 120, along the main dimension of the spatial configuration of the first array 116, the second array 118 and the third array 126 so as to select the group of the specific first alphanumerical character in the first array 116, the specific second alphanumerical character in the second array 118 and the specific third alphanumerical character in the third array 126.

A clickable scroll wheel is a scroll wheel that also has been provided with one or more switches that the user can manipulate by clicking the scroll wheel at the one or more relevant locations. In the example of FIG. 3, four directional icons (an "UP"-icon 308, a "DOWN"-icon 310, a "LEFT"-icon 312 and a "RIGHT"-icon 314) are positioned around the clickable scroll wheel 302 in a layout similar to that of the directional keys in the first example 200 of FIG. 2. When the information processing system 100 is in the first operational mode, clicking the clickable scroll wheel 302 at a respective location near a respective one of the "UP"-icon 308, the "DOWN"-icon 310, the "LEFT"-icon 312 and the "RIGHT"-icon 314 activates a respective switch (not shown) that has similar effects as pressing the respective one of the "UP"-button 202, the "DOWN"-button 204, the "LEFT"-button 206 and the "RIGHT"-button 208 in the first example 200 of FIG. 2.

In the second operational mode (text entry) of the information processing system 100, clicking the clickable scroll wheel 302 near the position of the "UP"-icon 308 causes the specific first alphanumerical character in the first array 116 to be selected from the group as a next entry into the field 122, and clicking the clickable scroll wheel 302 near the position of the "DOWN"-icon 310 causes the specific second alphanumerical character in the second array 118 to be selected from the group as a next entry into the field 122. As the "OK"-button sits between the "UP"-icon 308 and the "DOWN"-icon 310, the "OK"-button 124 is conveniently used to select the specific third alphanumerical character in the third array 126 from the group associated with the current position of the ellipse 120.

The user-interface 104 may have additional elements, e.g., buttons, keys or other widgets, that, in the second operational mode (text entry) of the information processing system 100, are configured to facilitate or enhance the text entry. Consider, for example, a user-interface of a remote control device for control of consumer electronics equipment. Typically, such user-interface includes additional buttons (not shown) that have well-known functions for interacting with an electronic program guide (EPG) or another control menu of a television set. Examples include: a "Menu"-button for causing the control menu to be displayed on the display monitor 102; a "Guide"-button for causing the EPG to be displayed on the display monitor 102; a "Back"-button for causing the display monitor 102 to display a previous level in a hierarchical or paged control menu or in a hierarchical or paged EPG, etc. When interacting with the information processing system 100 of the invention, which is operating in the second operational mode (text entry), the data processing sub-system 106 can be configured so that such additional buttons can be used, for example, for switching between upper case letters and lower case letters; for backspacing so as to delete the most recently entered alphanumerical characters in reverse order; for entering a dot (".") or a forward slash ("/") so as to expedite entering a URL, etc.

Returning now to the diagram of FIG. 1, the text entered so far reads: "Hello inventors Peh Beng Tee and Andries Rombouts, the UI works really well in the demo, and we h". The person interacting with the UI 104 would like to compose this cheerful message: "Hello inventors Peh Beng Tee and Andries Rombouts, the UI works really well in the demo, and we hope that the patent is going to be granted soon. Cheers, Jerry."

Figure 4:
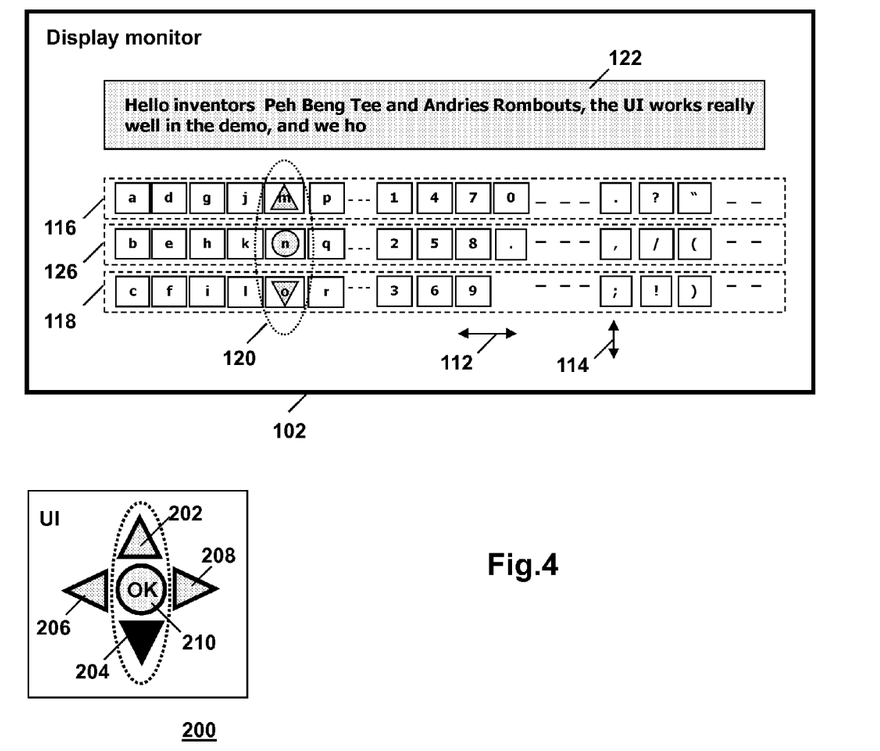
FIGS. 4, 5 and 6 illustrate using the user-interface for text entry.

Referring to the diagram of FIG. 4, the person (Jerry) needs to enter the text character "o" next in order to proceed composing the cheerful message. It is assumed that Jerry uses the first example 200 of the user-interface 104, that comprises the "UP"-button 202, the "DOWN"-button 204, the "LEFT"-button 206, the a "RIGHT"-button 208 and the central "OK"-button 210. As the ellipse 120 is already positioned over the group of characters "m", "n" and "o", Jerry presses the "DOWN"-button 204 to select the text character "o". Note that the relative positions of the text characters "m", "n" and "o" in the vertical group within the ellipse 120 correspond with the relative positions of the group of buttons formed by the "UP"-button 202, the central "OK"-button 210, and the "DOWN"-button 204 in the first example 200 of the user-interface 104. This correspondence between the relative positions is intuitively easy to grasp by the user of the first example 200 of the user-interface 104.

Figure 5:
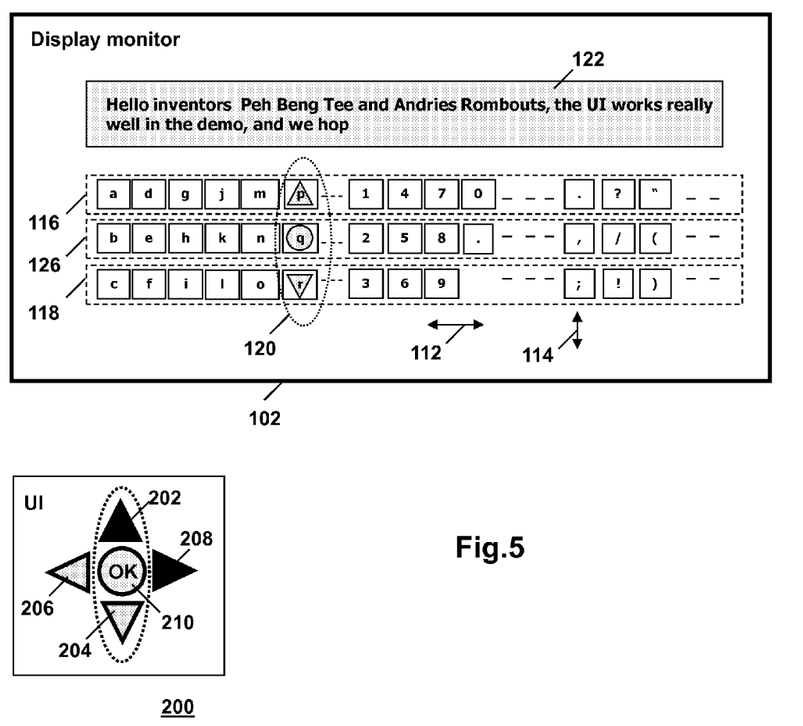

Referring to the diagram of FIG. 5, Jerry proceeds as follows in order to enter the next character "p". In order to enter the character "p", Jerry positions the ellipse 120 over the group of characters that contains the character "p". Accordingly, Jerry presses the "RIGHT"-button 208 once in order to shift the ellipse 120 one step to the right. The ellipse 120 is now positioned over the vertical group of characters "p", "q" and "r". Next, Jerry presses the "UP"-button 202 to select the letter "p".

Figure 6:
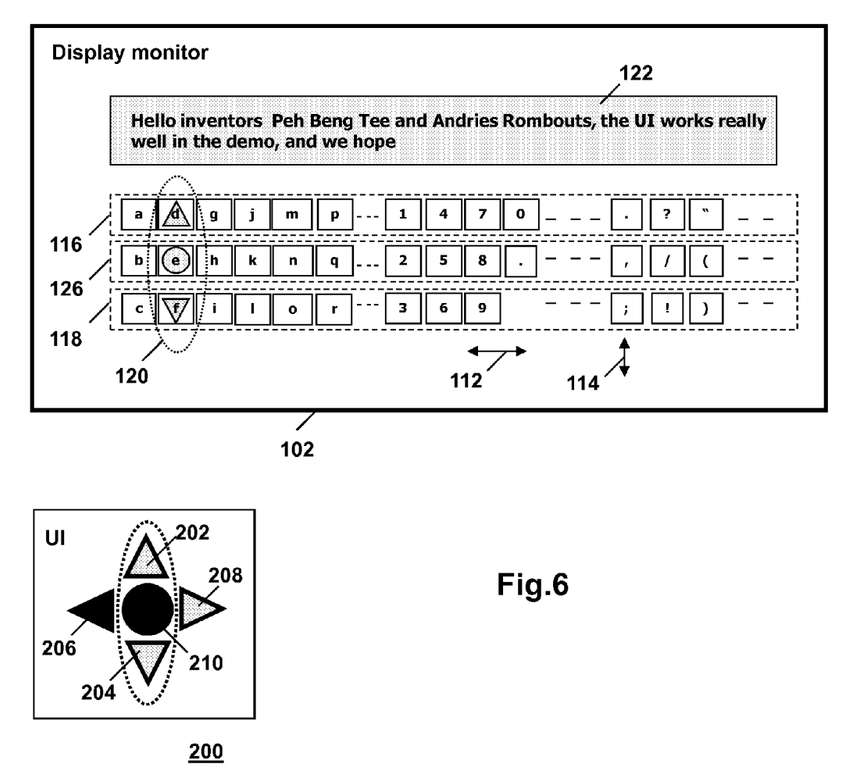

Referring to the diagram of FIG. 6, Jerry proceeds as follows in order to enter the next character "e". In order to enter the character "e", Jerry positions the ellipse 120 over the group of characters that contains the character "e". Accordingly, Jerry presses the "LEFT"-button 206 four times (or holds the "LEFT"-button 206 until the ellipse 120 has moved to the desired location) so as to position the ellipse 120 over the vertical group of characters "d", "e" and "f". Next, Jerry presses the central "OK"-button 210 in order to select the character "e". Again, note that the relative positions of the text characters "d", "e" and "f" in the vertical group within the ellipse 120 correspond with the relative positions of the group of buttons formed by the "UP"-button 202, the central "OK"-button 210, and the "DOWN"-button 204 in the first example 200 of the user-interface 104. The text characters of the remaining part of the cheerful message are entered in a similar manner as illustrated in the examples of FIGS. 1, 4, 5 and 6.

The invention claimed is:

1. An information processing system for handling alphanumeric characters, the system comprising:
   a processor coupled to memory;
   a user-interface operatively coupled to the processor, the user-interface having a first control input, and in response to the first control input, in a first operational mode of the information processing system, the processor performing at least one of:
   moving a cursor on a screen of a display monitor in a first orientation relative to the display monitor; and
   scrolling in the first orientation;
   the user-interface having a second control input, and in response to the second control input, in a second operational mode of the information processing system, the processor performing at least one of:
   moving the cursor on the screen in a second orientation relative to the display monitor, the second orientation being different from the first orientation, the first orientation and the second orientation being perpendicular to each other; and
   scrolling in the second orientation;
   the second operational mode of the information processing system enabling a user to enter a string of alphanumerical characters via interaction with the user-interface;
   in the second operational mode, the processor being configured to control the display monitor to present a plurality of selectable alphanumerical characters in a spatial configuration comprising a first array of first ones of the plurality of selectable alphanumerical characters and a second array of second ones of the plurality of selectable alphanumerical characters;
   the processor being further configured to:
   (i) enable the user to select a certain combination of a certain one of the first alphanumerical characters and a certain one of the second alphanumerical characters through positioning an indicium at a certain position corresponding with the certain combination in the spatial configuration using one of the first control input and the second control input; and
   (ii) enable the user to select a particular one of the certain first alphanumerical character and the certain second alphanumerical character through using the other one of the first control input and the second control input;

the first control input having at least one of:
a first set including a first switch configured to move the cursor in a first direction in the first orientation and a second switch configured to move the cursor in a second direction, the second direction being opposite to the first direction, in the first orientation; and
a scroll wheel configured to scroll in the first direction or in the second direction in dependence on a clockwise rotation of the first scroll wheel or an anticlockwise rotation of the first scroll wheel;
the second control input having:
a second set including a third switch configured to move the cursor in a third direction in the second orientation and a fourth switch configured to move the cursor in a fourth direction, the fourth direction being opposite to the third direction, in the second orientation;
the user-interface having a third control input, and in response to the third control input, in the first operational mode, confirming selection of a menu option by the user after having positioned the cursor at the menu option,
the third control input being positioned in the user-interface between the first switch and the second switch and between the third switch and the fourth switch;
the spatial configuration comprising a third array with third ones of the plurality of selectable alphanumerical characters;
the third array extending in the same certain one of the first orientation and the second orientation;
the third array being positioned between the first array and the second array; and
in the second operational mode, the processor being configured to enable the user to select a certain one of the third alphanumerical characters that is located between the certain first alphanumerical character and the certain second alphanumerical character, via the third control input,
wherein the display monitor is operative to present the first array, the second array, and the third array as extending in parallel with each other in a same certain one of the first orientation and the second orientation, and the indicium is positioned to highlight the first alphanumerical character of the first array, the second alphanumerical character of the second array, and the third alphanumerical character of the third array, the indicium extending in a perpendicular fashion with respect to the first array, the second array, and the third array.

2. The information processing system of claim 1, wherein the scroll wheel is a user-clickable scroll wheel arranged to, when clicked, activate the first switch, the second switch, the third switch or the fourth switch.

3. The system of claim 1, wherein the first orientation is horizontal with respect to a horizontal axis of the display screen and the second orientation is vertical with respect to the horizontal axis of the display screen.

4. The system of claim 1, wherein the user-interface forms a portion of a remote control device, and the processor performs at least one of the moving and the scrolling based upon the remote control device.

5. A computer-implemented method of handling alphanumeric characters in an information processing system, the method comprising:

a processor supporting the information processing system, providing a user-interface enabling a user to interact with the information processing system through a display monitor;
the processor: including in the user-interface a first control input, and in a first operational mode, the first control input enabling the user to control at least one of:
moving a cursor on a screen of the display monitor in a first orientation relative to the display monitor; and
scrolling in the first orientation;
including in the user-interface a second control input, and in the first operational mode, the second control input enabling the user to control at least one of:
moving the cursor on the screen in a second orientation relative to the display monitor, the second orientation being different from the first orientation, the first orientation and the second orientation being perpendicular to each other; and
scrolling in the second orientation;
the first control input has at least one of:
a first set including a first switch configured to move the cursor in a first direction in the first orientation and a second switch configured to move the cursor in a second direction, the second direction being opposite to the first direction, in the first orientation; and
a scroll wheel configured to scroll in the first direction or in the second direction in dependence on a clockwise rotation of the first scroll wheel or an anticlockwise rotation of the first scroll wheel;
the second control input having:
a second set including a third switch configured to move the cursor in a third direction in the second orientation and a fourth switch configured to move the cursor in a fourth direction, the fourth direction being opposite to the third direction, in the second orientation;
the second operational mode enabling the user to enter a string of alphanumerical characters using the user-interface, by the processor:
controlling the display monitor to present a plurality of user-selectable alphanumerical characters in a spatial configuration comprising a first array of first ones of the plurality of selectable alphanumerical characters and a second array of second ones of the plurality of selectable alphanumerical characters;
selecting a certain combination of a certain one of the first alphanumerical characters and a certain one of the second alphanumerical characters through positioning an indicium at a certain position corresponding with the certain combination in the spatial configuration in response to the user interacting with one of the first control input and the second control input; and
selecting a particular one of the certain first alphanumerical character and the certain second alphanumerical character in response to the user interacting with the other one of the first control input and the second control input, wherein the user-interface comprises a third control input, in the first operational mode, the third control input confirming selection of a menu option by the user after having positioned the cursor at the menu option,
the third control input being positioned in the user-interface between the first switch and the second switch and between the third switch and the fourth switch;

the spatial configuration comprising a third array with third ones of the plurality of selectable alphanumerical characters;
the third array extending in the same certain one of the first orientation and the second orientation;
the third array being positioned between the first array and the second array; and
selecting a certain one of the third alphanumerical characters that is located between the certain first alphanumerical character and the certain second alphanumerical character, in response to the user interacting with the third control input,
wherein the display monitor is operative to present the first array, the second array, and the third array as extending in parallel with each other in a same certain one of the first orientation and the second orientation, and the indicium is positioned to highlight the first alphanumerical character of the first array, the second alphanumerical character of the second array, and the third alphanumerical character of the third array, the indicium extending in a perpendicular fashion with respect to the first array, the second array, and the third array.

6. The method of claim 5, wherein the first orientation is horizontal with respect to a horizontal axis of the display screen and the second orientation is vertical with respect to the horizontal axis of the display screen.

7. The method of claim 5, wherein the first control input and the second control input are implemented by a remote control input device.

8. A non-transitory computer readable medium comprising:
memory storage; and
instructions stored in the memory storage embodying alphanumeric character handing, the instructions when loaded and executed by a processor coupled to an apparatus, causing the apparatus to:
provide a user interface through a display monitor, the user-interface comprising a:
(a) first control input, and in a first operational mode the first control input enables a user to control at least one of:
moving a cursor on a screen of the display monitor in a first orientation relative to the display monitor; and
scrolling in the first orientation; and
(b) a second control input, in the first operational mode the second control input enables the user to control at least one of:
moving the cursor on the screen in a second orientation relative to the display monitor, the second orientation being different from the first orientation, the first orientation and the second orientation being perpendicular to each other; and
scrolling in the second orientation, wherein the first control input has at least one of:
a first set including a first switch configured to move the cursor in a first direction in the first orientation and a second switch configured to move the cursor in a second direction, the second direction being opposite to the first direction, in the first orientation; and
a scroll wheel configured to scroll in the first direction or in the second direction in dependence on a clockwise rotation of the first scroll wheel or an anti-clockwise rotation of the first scroll wheel,
the second control input having:

a second set including a third switch configured to move the cursor in a third direction in the second orientation and a fourth switch configured to move the cursor in a fourth direction, the fourth direction being opposite to the third direction, in the second orientation;
the instructions including one or more instructions to operate in a second operational mode, the second operational mode enabling the user to enter a string of alphanumerical characters using the user-interface, the one or more instructions:
controlling the display monitor to present a plurality of user-selectable alphanumerical characters in a spatial configuration comprising a first array of first ones of the plurality of selectable alphanumerical characters and a second array of second ones of the plurality of selectable alphanumerical characters;
selecting a certain combination of a certain one of the first alphanumerical characters and a certain one of the second alphanumerical characters through positioning an indicium at a certain position corresponding with the certain combination in the spatial configuration in response to the user interacting with one of the first control input and the second control input; and
selecting a particular one of the certain first alphanumerical character and the certain second alphanumerical character in response to the user interacting with the other one of the first control input and the second control input, wherein the user-interface comprises a third control input, in the first operational mode the third control input confirming selection of a menu option by the user after having positioned the cursor at the menu option,
the third control input being positioned in the user-interface between the first switch and the second switch and between the third switch and the fourth switch;
the spatial configuration comprising a third array with third ones of the plurality of selectable alphanumerical characters;
the third array extending in the same certain one of the first orientation and the second orientation;
the third array being positioned between the first array and the second array; and
selecting a certain one of the third alphanumerical characters that is located between the certain first alphanumerical character and the certain second alphanumerical character, in response to the user interacting with the third control input,
wherein the display monitor is operative to present the first array, the second array, and the third array as extending in parallel with each other in a same certain one of the first orientation and the second orientation, and the indicium is positioned to highlight the first alphanumerical character of the first array, the second alphanumerical character of the second array, and the third alphanumerical character of the third array, the indicium extending in a perpendicular fashion with respect to the first array, the second array, and the third array.

* * * * *